(12) United States Patent
Lee et al.

(10) Patent No.: US 10,963,066 B2
(45) Date of Patent: Mar. 30, 2021

(54) KEYBOARD INPUT SYSTEM AND KEYBOARD INPUT METHOD USING FINGER GESTURE RECOGNITION

(71) Applicant: SEOUL NATIONAL UNIVERSITY R&DB FOUNDATION, Seoul (KR)

(72) Inventors: Hyukjae Lee, Seongnam-si (KR); Taeho Lee, Anyang-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/626,788

(22) PCT Filed: Jun. 26, 2018

(86) PCT No.: PCT/KR2018/007198
§ 371 (c)(1),
(2) Date: Dec. 26, 2019

(87) PCT Pub. No.: WO2019/004686
PCT Pub. Date: Jan. 3, 2019

(65) Prior Publication Data
US 2020/0117282 A1   Apr. 16, 2020

(30) Foreign Application Priority Data
Jun. 26, 2017   (KR) .......................... 10-2017-0080458

(51) Int. Cl.
*G06F 3/01* (2006.01)
*G06T 7/64* (2017.01)
(Continued)

(52) U.S. Cl.
CPC ............ *G06F 3/017* (2013.01); *G06F 3/0487* (2013.01); *G06K 9/00355* (2013.01);
(Continued)

(58) Field of Classification Search
CPC ...... G06F 3/017; G06F 3/0487; G06F 3/0233; G06F 3/011; G06T 7/73; G06T 7/246;
(Continued)

(56) References Cited

U.S. PATENT DOCUMENTS

| 8,928,589 B2 * | 1/2015 | Bi ........................... G06F 3/005 345/168 |
| 10,606,343 B2 * | 3/2020 | Veeramani .............. G06F 3/011 |

(Continued)

FOREIGN PATENT DOCUMENTS

| JP | 2014-165660 A | 9/2014 |
| JP | 2017-058818 A | 3/2017 |

(Continued)

OTHER PUBLICATIONS

Notification Concerning Transmittal of International Preliminary Report on Patentability for related International Application No. PCT/KR2018/007198, dated Jan. 9, 2020; 1 page.

(Continued)

*Primary Examiner* — Muhammad N Edun
(74) *Attorney, Agent, or Firm* — Procopio, Cory, Hargreaves & Savitch LLP

(57) ABSTRACT

Disclosed are a keyboard input system and a keyboard input method using finger gesture recognition. The keyboard input system includes: a virtual keyboard display unit configured to overlap and display a virtual keyboard having keys arranged on an image obtained by an image capturing unit; and a virtual keyboard input unit configured to output a key of the virtual keyboard based on a user's finger gesture recognized in the image. The virtual keyboard input unit includes: a finger recognition unit configured to recognize a finger gesture of the user in the image; a click gesture determination unit configured to determine whether the finger gesture corresponds to a set click gesture; and a key (Continued)

output unit configured to determine a key overlapping with a set finger position of the user when the click gesture occurs. The click gesture includes an interaction between at least two fingers of the user.

19 Claims, 19 Drawing Sheets

(51) Int. Cl.
  *G06T 7/246* (2017.01)
  *G06T 7/73* (2017.01)
  *G06F 3/0487* (2013.01)
  *G06K 9/00* (2006.01)

(52) U.S. Cl.
  CPC .......... *G06K 9/00362* (2013.01); *G06T 7/246* (2017.01); *G06T 7/64* (2017.01); *G06T 7/73* (2017.01); *G06T 2207/30196* (2013.01)

(58) Field of Classification Search
  CPC . G06T 19/00; G06T 7/64; G06T 2207/30196; G06K 9/00355; G06K 9/00; G06K 9/00362
  See application file for complete search history.

(56) References Cited

U.S. PATENT DOCUMENTS

| | | | | |
|---|---|---|---|---|
| 2011/0221678 | A1* | 9/2011 | Davydov | G06F 3/0486 345/168 |
| 2012/0216114 | A1* | 8/2012 | Privault | G06F 3/04883 715/702 |
| 2015/0105153 | A1* | 4/2015 | Xu | A63F 13/798 463/31 |
| 2016/0253044 | A1* | 9/2016 | Katz | G06F 3/04842 345/156 |

FOREIGN PATENT DOCUMENTS

| | | |
|---|---|---|
| KR | 10-2004-0091940 A | 11/2004 |
| KR | 10-2005-0048978 A | 5/2005 |
| KR | 10-2015-0075481 A | 7/2015 |
| KR | 10-2015-0075648 A | 7/2015 |
| KR | 10-2016-0097410 A | 8/2016 |
| KR | 10-2016-0109336 A | 9/2016 |

OTHER PUBLICATIONS

International Preliminary Report on Patentability with translation of the Written Opinion of the International Searching Authority for related International Application No. PCT/KR2018/007198, dated Dec. 31, 2019; 10 pages.

Notification of Transmittal of Translation of the International Preliminary Report on Patentability for related International Application No. PCT/KR2018/007198, dated Jan. 9, 2020; 1 page.

International Search Report and Written Opinion for related International Application No. PCT/KR2018/007198, dated Sep. 19, 2018; English translation of ISR provided (11 pages).

Sarkar, A. et al. "Hand Gesture Recognition Systems: A Survey," International Journal of Computer Applications, May 2013, pp. 26-37,vol. 71, No. 15.

Quin, S. et al. "Real-time Hand Gesture Recognition from Depth Images Using Convex Shape Decomposition Method," Journal of Signal Processing Systems, Jan. 2014, pp. 47-58, vol. 74, Issue 1.

Kato, H. et al. "Virtual object manipulation on a table-top AR environment," IEEE and ACM International Symposium on Augmented Reality(ISAR'00),2000, pp. 111-119.

Lee T. et al. "Handy AR: Markerless Inspection of Augmented Reality Objects Using Fingertip Tracking," IEEE International Symposium on Wearable Computers, 2007 (8 pages).

La Viola, J. et al. "A Survey of Hand Posture and Gesture Recognition Techniques and Technology," Technical Report CS-99-11, Brown University, 1999 (80 pages).

Lockton, R. et al. "Real-time gesture recognition using deterministic boosting," British Machine Vision Conference, 2002, pp. 817-826, vol. 2.

Argyros, A. et al. "Vision-Based Interpretation of Hand Gestures for Remote Control of a Computer Mouse," Lecture Notes in Computer Science, 2006, pp. 40-51, vol. 3979.

Liu, N. et al, "Hand Gesture Extraction by Active Shape Models," Digital Image Computing: Techniques and Applications, 2005, pp. 10-15.

Kolsch, M. et al. "Keyboards without keyboards: A survey of virtual keyboards," Univ. California, Berkeley, Tech. Rep. 2002-21, 2002 (8 pages).

Yin, P.-Y. et al. "Cyber Swarm optimization for general keyboard arrangement problem," International Journal of Industrial Ergonomics, Jan. 2011, pp. 43-52, vol. 41, Issue 1.

Smith, B. et al. "Optimizing Touchscreen Keyboards for Gesture Typing," Proc. ACM CHI'15, 2015, pp. 3365-3374, Seoul, Korea.

MacKenzie, I. et al. "The design and evaluation of a high-performance soft-keyboard," in Proc. of CHI'99: ACM Conference on Human Factors in Computing Systems, 1999, Pittsburgh, PA, pp. 25-31.

Zhai, S. et al. "The Metropolis keyboard—An exploration of quantitative techniques for virtual keyboard design," in Proc. of UIST 2000, pp. 119-128, San Diego, California (10 pages).

Togootogtokh, E. et al. "Multimedia content analysis on gesture event detection for a Smart TV Keyboard application," Multimed Tools Appl (2017), Mar. 5, 2016, pp. 7341-7363.

Markussen, A. et al. "Vulture: A Mid-Air Word-Gesture Keyboard," CHI 2014, One of a CHInd, Toronto, ON, Canada, Session: Mid-Air Gestures; Apr. 26-May 1, 2014, (10 pages).

* cited by examiner

FIG. 14

| 0 T Y | 1 H M | 2 A L | 3 F J |
|---|---|---|---|
| 4 D V | 5 E C | 6 N K | 7 O W |
| 8 U P | 9 R B | & I Z | % S Q |
| rst pow | space | Eng. Num. Symbol | # G X |

FIG. 15

| 0 T Y | 1 H B | 2 A Y | 3 C |
|---|---|---|---|
| 4 D J | 5 E P | 6 N Q | 7 O W |
| 8 U X | 9 R K | # I V | * L G |
| ! W | $ M | % S | ^ F |
| rst pow | space | Eng. Num. Symbol | Power |

FIG. 24

| | | |
|---|---|---|
| O U Q | A P B | R M J |
| N G X | T L Y | E D V |
| I F Z | S C K | H W |
| reset power | space | Eng. Num. Symbol |

KEYBOARD INPUT SYSTEM AND KEYBOARD INPUT METHOD USING FINGER GESTURE RECOGNITION

CROSS-REFERENCE TO RELATED APPLICATIONS

This U.S. non-provisional patent application claims priority under 35 U.S.C. § 119 of Korean Patent Application No. 10-2017-0080458, filed on Jun. 26, 2017, the entire contents of which are hereby incorporated by reference.

TECHNICAL FIELD

The present invention relates to a keyboard input system and a keyboard input method using finger gesture recognition.

BACKGROUND ART

Recently, due to the development of digital media, augmented reality technology for synthesizing virtual objects or information in a real environment has become popular, and thus, there is a growing demand for an interface technology that can be inputted through a camera. In augmented reality where a real world and a virtual world coexist together, various methods for controlling a user's virtual image or image have been studied. Keyboards and mice used in computer systems are the most common and important input devices, but they are inconvenient in volume for use in portable devices. In order to solve this problem, a virtual keyboard-type input device was developed. For intuitive and natural interaction between people and computers, a lot of researches on the interface method using the user's hand gesture are under development. The conventional hand gesture recognition method recognizes fingertip movements using geometric features through machine learning, and recognizes a click gesture of a fingertip. When this method is applied to an environment such as augmented reality, it is difficult to accurately determine whether a key is clicked because it cannot be touched on the space. The data glove-based input method that recognizes the movement of the markers requires additional equipment such as gloves and markers, which is expensive and makes the user feel inconvenient to wear gloves.

DISCLOSURE OF THE INVENTION

Technical Problem

The present invention is to provide a keyboard input system and a keyboard input method that enables faster input using finger gesture recognition.

In addition, the present invention is to provide a keyboard input system and a keyboard input method capable of accurately recognizing a finger gesture and accurately determining a click gesture.

In addition, the present invention is to provide a keyboard input system and a keyboard input method that can significantly reduce the standby time due to the continuous input of the multi-tap key.

In addition, the present invention is to provide a keyboard input system and a keyboard input method capable of shortening an input time by optimizing a key arrangement structure of a virtual keyboard based on finger gesture recognition.

The problem to be solved by the present invention is not limited to the above-mentioned problem. Other technical problems not mentioned will be clearly understood by those skilled in the art from the following description.

Technical Solution

A keyboard input system according to the present invention includes: a virtual keyboard display unit configured to overlap and display a virtual keyboard having keys arranged on an image obtained by an image capturing unit; and a virtual keyboard input unit configured to output a key of the virtual keyboard based on a user's finger gesture recognized in the image.

The virtual keyboard input unit may include: a finger recognition unit configured to recognize a finger gesture of the user in the image; a click gesture determination unit configured to determine whether the finger gesture corresponds to a set click gesture; and a key output unit configured to determine a key overlapping with a set finger position of the user when the click gesture occurs.

The click gesture may include an interaction between at least two fingers of the user.

The click gesture may be an operation in which the thumb of the user contacts or approaches the index finger, and the set finger position may be a position of an end portion of the index finger of the user.

The finger recognition unit may be configured to; obtain a convex hull including a hand region of the user; obtain convexity defects including depth information between the user's fingers; and track a finger position based on boundary points extracted from the convex hull of the hand region and the convexity defect.

The click gesture determination unit may be configured to: determine a fingernail position of the user's thumb; calculate a distance between a fingernail position of the thumb and a convex defect between the user's thumb and index finger; and determine the click gesture based on the distance between the thumbnail position of the thumb and the convexity defect.

The virtual keyboard may include a plurality of key boxes, and at least one of the key boxes may be provided as a multi-tap key in which keys are arranged as a plurality of layers.

The virtual keyboard input unit may further include a layer gesture determination unit configured to determine a set layer gesture from the user's finger gesture.

The key output unit may be configured to determine a key of a layer corresponding to the layer gesture among the multi-tap keys.

The layer gesture determination unit may be configured to calculate the number of fingers extended by the user when the click gesture occurs, and determine the layer gesture based on the number of fingers.

The layer gesture determination unit may be configured to: when the user extends only the index finger among four fingers except for the thumb, determine as a first layer gesture; and when the user extends only the index finger and the middle finger among four fingers except for the thumb, determine as a second layer gesture.

The key output unit may be configured to: when the user's finger gesture corresponds to the first layer gesture, output a key of a first layer of the multi-tap key; and when the user's finger gesture corresponds to the second layer gesture, output a key of a second layer of the multi-tap key.

The virtual keyboard input unit may further include a grab gesture determination unit configured to determine whether the user's finger gesture corresponds to a set grab gesture.

When the finger gesture corresponds to a grab gesture, the virtual keyboard display unit may be configured to switch and display keys of the virtual keyboard among a plurality of key types including at least two of letters, numbers, and symbols.

The keyboard input system may further include a key arrangement determination unit configured to determine a key arrangement of the virtual keyboard based on an appearance frequency of keys in predetermined words or sentences, and an adjacency frequency between the keys in the words or sentences.

The key arrangement determination unit may be configured to calculate an input time of the words or sentences based on a user's finger traveling distance, a key input time, and a standby time according to continuous input of a multi-tap key when the words or sentences are inputted to the virtual keyboard, and determine the arrangement of the keys such that the input time is minimum.

A keyboard input method includes: overlapping and displaying a virtual keyboard having keys arranged on an image obtained by an image capturing unit; and outputting a key of the virtual keyboard based on a user's finger gesture recognized in the image.

The outputting of the key may include: recognizing a finger gesture of the user in the image and determining whether the finger gesture corresponds to a set click gesture; and determining a key overlapping with the set finger position of the user when the click gesture occurs.

The click gesture may include an interaction between at least two fingers of the user. The click gesture may be an operation in which the thumb of the user contacts the index finger, and the set finger position may be a position of an end portion of the index finger of the user.

The determining of whether the finger gesture corresponds to the set click gesture may include: obtaining a convex hull including a hand region of the user; obtaining convexity defects including depth information between the user's fingers; tracking a finger position based on boundary points extracted from the convex hull of the hand region and the convexity defect; determining a fingernail position of the user's thumb from the tracked finger position; calculating a distance between the fingernail position of the thumb and the convex defect between the thumb and the index finger; and determining the click gesture based on the distance between the thumbnail position of the thumb and the convexity defect between the thumb and the index finger.

The virtual keyboard may include a plurality of key boxes, and at least one of the key boxes may be provided as a multi-tap key in which keys are arranged as a plurality of layers.

The virtual keyboard input method may further include determining a set layer gesture from the user's finger gesture.

The outputting of the key may include determining a key of a layer corresponding to the layer gesture among the multi-tap keys.

The determining of the layer gesture may include calculating the number of fingers extended by the user when the click gesture occurs, and determining the layer gesture from the number of fingers.

The method may further include determining whether the user's finger gesture corresponds to a set grab gesture.

The overlapping and displaying of the virtual keyboard may include, when the finger gesture corresponds to a grab gesture, switching and displaying keys of the virtual keyboard among a plurality of key types including at least two of letters, numbers, and symbols.

The method may further include determining a key arrangement of the virtual keyboard based on a frequency of keys in words or sentences, and an adjacency frequency between the keys in the words or sentences.

The determining of the key arrangement of the virtual keyboard may include calculating an input time of the words or sentences based on a user's finger traveling distance between keys, an input time of keys, and a standby time according to continuous input of a multi-tap key when the words or sentences are inputted to the virtual keyboard, and determining the arrangement of the keys such that the input time is minimum.

According to the present invention, provided is a computer-readable recording medium having recorded thereon a program for executing the keyboard input method.

Advantageous Effects

According to an embodiment of the present invention, a keyboard input system and a keyboard input method for enabling faster input using finger gesture recognition are provided.

In addition, according to an embodiment of the present invention, there is provided a keyboard input system and a keyboard input method capable of accurately recognizing a finger gesture and accurately determining a click gesture.

In addition, according to an embodiment of the present invention, there is provided a keyboard input system and a keyboard input method that can greatly reduce the standby time due to continuous input of a multi-tap key.

Furthermore, according to an embodiment of the present invention, there are provided a keyboard input system and a keyboard input method capable of shortening an input time by optimizing a key arrangement structure of a virtual keyboard based on finger gesture recognition.

The effects of the present invention are not limited to the effects described above. Effects that are not mentioned will be clearly understood by those skilled in the art from the present specification and the accompanying drawings.

BRIEF DESCRIPTION OF THE DRAWINGS

FIGS. 14 and 15 illustrate other examples of a virtual keyboard provided by a keyboard input method according to an embodiment of the present invention.

FIG. 24 is a diagram illustrating an arrangement of keys optimized for a virtual keyboard having a layer gesture recognition function.

MODE FOR CARRYING OUT THE INVENTION

Figure 1:
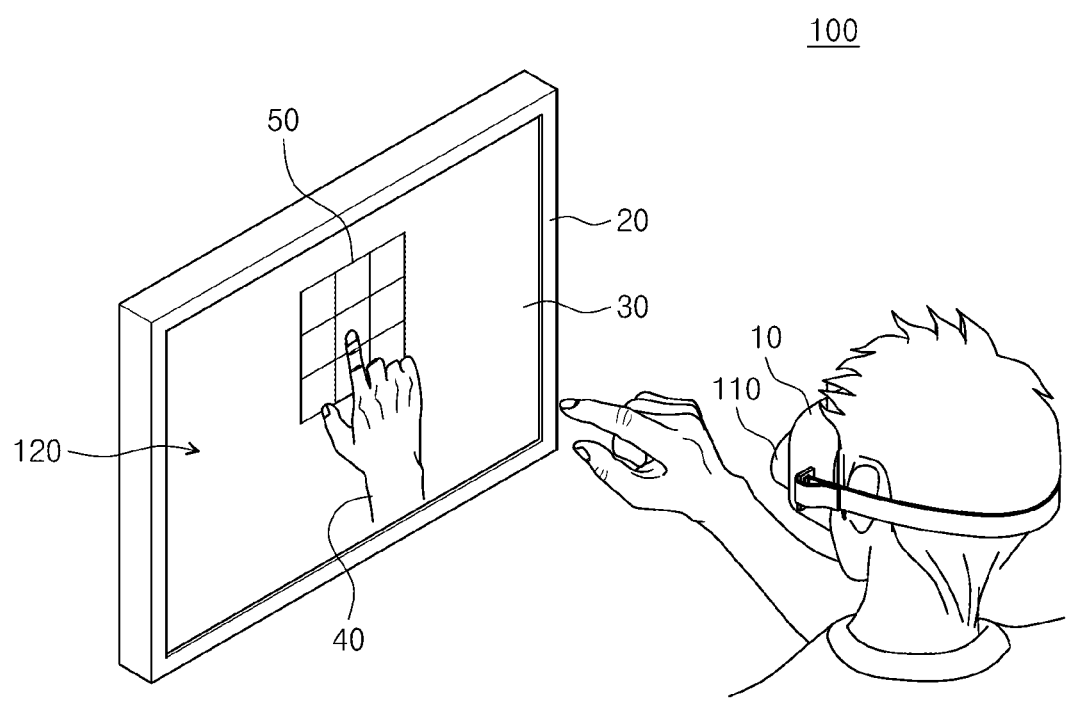
FIG. 1 is a view showing a keyboard input system according to an embodiment of the present invention.

Other advantages and features of the inventive concept, and implementation methods thereof will be clarified through following embodiments described with reference to the accompanying drawings. However, the inventive concept is not limited to embodiments disclosed below and is only defined by the appended claims. Although not defined, all the terms used herein (including technical or scientific terms) have the same meaning as those accepted by common techniques in the conventional techniques that this inventive concept belongs. General descriptions of known configurations may be omitted in order not to obscure the subject matter of the inventive concept. The same reference numerals are used as much as possible with respect to the same or corresponding configuration in the drawings of the inventive concept. In order to help the understanding of the present invention, some of the components may be somewhat exaggerated or reduced in the drawings.

Terms used in this specification are used to describe specific embodiments, and are not intended to limit the scope of the present invention. The singular expressions include plural expressions unless the context clearly dictates otherwise. Additionally, in various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

As used throughout the present specification, '~part' is a unit for processing at least one function or operation and may mean, for example, a hardware component such as software, FPGA, or ASIC. However, '~part' is not meant to be limited to software or hardware. The '~part' may be configured to be addressable storage media and configured to execute one or more processors.

For example, the '~part' may include components such as software components, object-oriented software components, class components, and task components, routines, processes, functions, attributes, procedures, subroutines, segments of program code, drivers, firmware, microcode, circuits, data, databases, data structures, tables, arrays, and variables. The functions provided by the component and the '~part' may be performed separately by the plurality of components and the '~part', or may be integrated with other additional components.

The keyboard input system according to an embodiment of the present invention is configured to display a virtual keyboard overlapping an image of a user's hand, and to output a key of the virtual keyboard based on a user's finger gesture recognized in the image. If a finger gesture corresponds to a set click gesture (for example, a thumb touching the side of the index finger), the keyboard input system is configured to determine and output a key that overlaps with the user's set finger position (for example, the fingernail portion of the index finger) at the moment the click gesture occurs.

In an embodiment of the present invention, when the key of the virtual keyboard is provided in a multi-tap structure having a plurality of layers, the keyboard input system is configured to determine a layer gesture (for example, spreading a finger such as a middle finger or ring finger) from a user's finger gesture, and to output a key of the layer corresponding to the layer gesture at a key overlapping with the user's set finger position (e.g., the fingernail portion of the index finger) at the moment the click gesture occurs.

Figure 2:
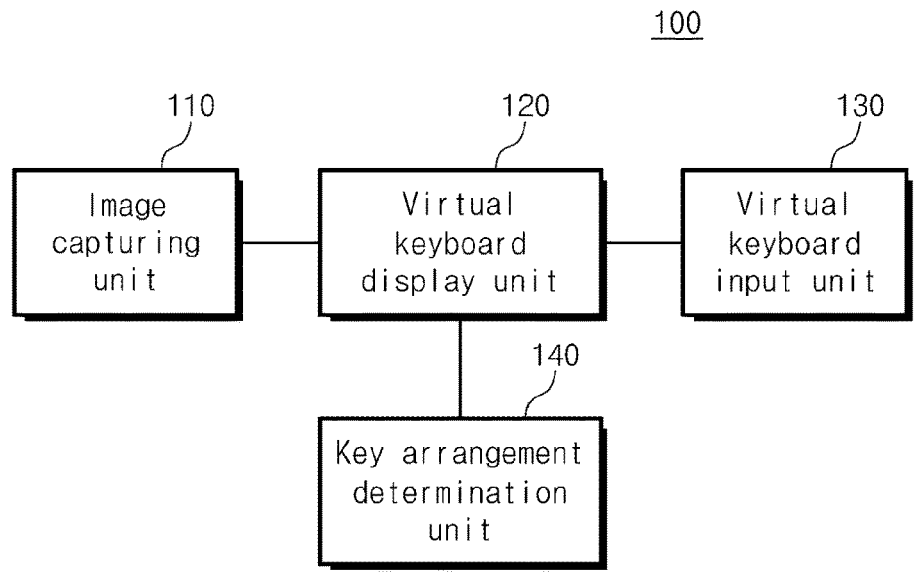
FIG. 2 is a block diagram of a keyboard input system according to an embodiment of the present invention.

FIG. 1 is a view showing a keyboard input system according to an embodiment of the present invention. FIG. 2 is a block diagram of a keyboard input system according to an embodiment of the present invention. Referring to FIGS. 1 and 2, the keyboard input system 100 according to an embodiment of the present invention may recognize a user's finger gesture and input a virtual keyboard on an image display screen in various environments such as augmented reality.

The keyboard input system 100 may include an image capturing unit 110, a virtual keyboard display unit 120, and a virtual keyboard input unit 130. Each component of the keyboard input system 100 may be connected to a control unit including one or more processors and a memory (not shown) through a wired/wireless interface.

The image capturing unit 110 may generate a video image 30 by continuously photographing the user's hand. In order to input the virtual keyboard 50 based on the user's finger gesture, the video image 30 obtained by the image capturing unit 110 is inputted to the virtual keyboard display unit 120. The video image 30 obtained by the image capturing unit 110 is displayed on the screen of the image display device 20 by the virtual keyboard display unit 120.

The virtual keyboard display unit 120 is configured to overlap the virtual keyboard 50 having the keys arranged on the image obtained by the image capturing unit 110, so as to overlap the virtual keyboard 50 on the image 30 including the user's hand 40 on the screen of the image display device 20 and display the result.

The user is configured to input the virtual keyboard 50 by adjusting a finger gesture displayed on the screen of the image display device 20. In an embodiment, by matching the shape of the hand that the user looks at with the shape of the hand 40 displayed on the screen of the image display device 20 as much as possible, in order to allow the user to naturally adjust the finger gestures for the input of the virtual keyboard 50, the image capturing unit 110 may be mounted at a position close to the eyes of the user.

In the embodiment shown in FIG. 1, the image capturing unit 110 is mounted on the eyeglasses 10 worn by the user. The image capturing unit 110 does not necessarily need to be worn by the user, and the installation position, direction, etc. are not particularly limited as long as it is suitable for photographing the user's hand. For example, the image capturing unit 110 may be mounted on the image display device 20 and may be disposed anywhere around the user. The image capturing unit 110 may be provided as, for example, a Charge Coupled Device (CCD) camera, a Complementary Metal-Oxide Semiconductor (CMOS) camera, or the like, but is not limited thereto.

Figure 3:
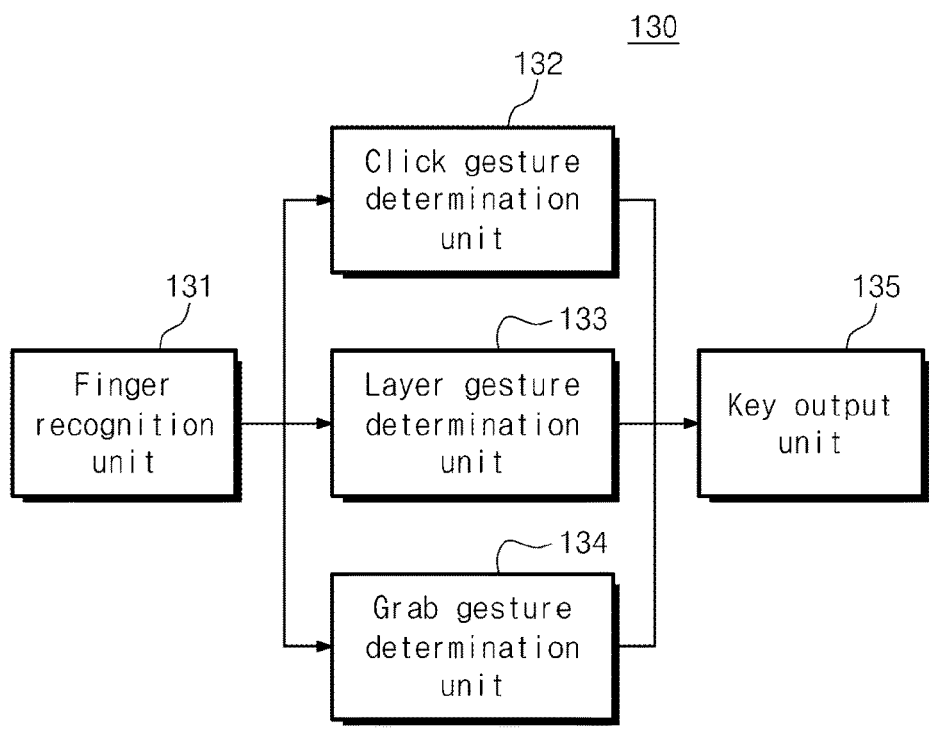
FIG. 3 is a block diagram of a virtual keyboard input unit constituting a keyboard input system according to an embodiment of the present invention.

FIG. 3 is a block diagram of a virtual keyboard input unit constituting a keyboard input system according to an embodiment of the present invention. Referring to FIGS. 1 to 3, the virtual keyboard input unit 130 is configured to recognize finger gestures of a user in an image 30 obtained by the image capturing unit 110 and displayed on a screen of the image display device 20, and to output the keys of the virtual keyboard 50 based on the recognized user's finger gestures.

In order to clearly recognize a user's click (input) behavior, the virtual keyboard input unit 130 may include a finger recognition unit 131, a click gesture determination unit 132, and a key output unit 135.

The finger recognition unit 131 is configured to recognize a user's finger gesture in the image 30. A detailed method for the finger recognition unit 131 to recognize a user's finger gesture will be described later.

The click gesture determination unit 132 determines whether the user's finger gesture recognized by the finger recognition unit 131 corresponds to the set click gesture. In this case, in order to clearly recognize the user's click input, the click gesture may include an interaction between at least two fingers of the user. In one embodiment, the click gesture may be a gesture in which the user's thumb is in contact with or near the side of the index finger.

The key of the virtual keyboard 50 is outputted only when a finger gesture corresponding to the click gesture is generated by the user. The key output unit 135 is configured to determine and output a key that overlaps with the set finger position of the user among the keys of the virtual keyboard 50 when a click gesture occurs. In an embodiment, the set finger position may be a position of an end portion (fingernail portion) of the user's index finger. In other words, when a user allows the thumb to contact the index finger, the key output unit 135 may be configured to output the key of the virtual keyboard 50 indicated by the end of the index finger.

Figure 4:
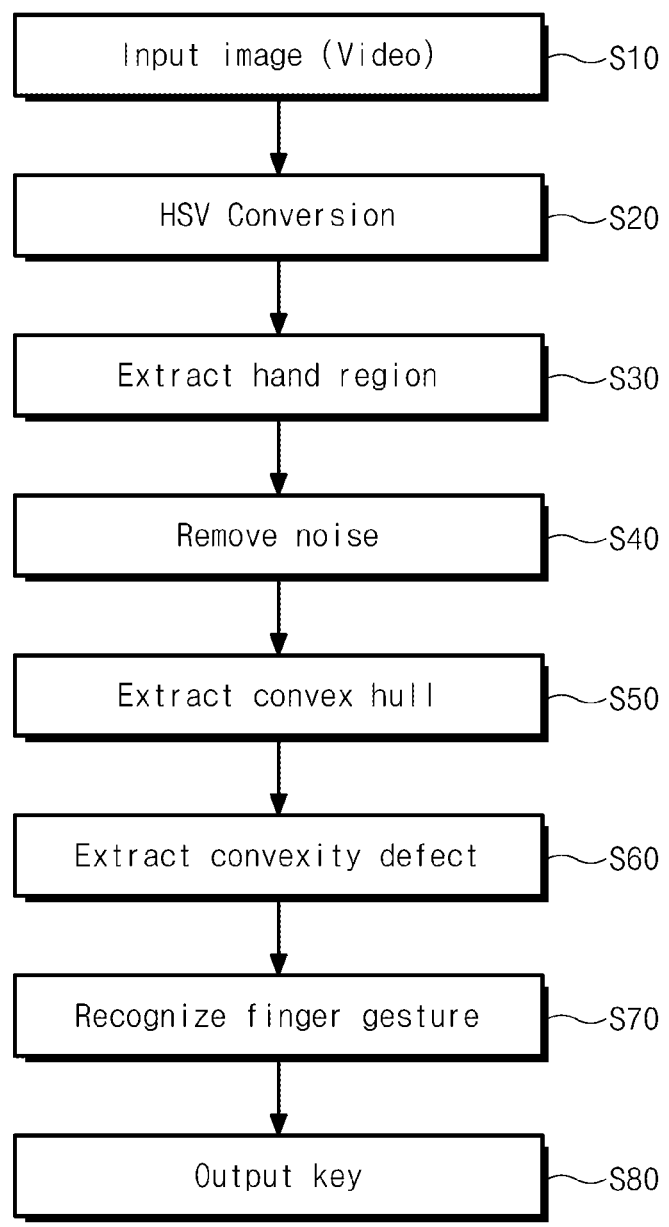
FIG. 4 is a flowchart illustrating a keyboard input method according to an embodiment of the present invention.

FIG. 4 is a flowchart illustrating a keyboard input method according to an embodiment of the present invention. Referring to FIGS. 1, 2 and 4, the image capturing unit 110 photographs a user's hand to generate a video image, and inputs the video image to the virtual keyboard display unit 120 (S10). The virtual keyboard display unit 120 overlaps the virtual keyboard 50 on the image 30 including the user's hand 40 and displays the result on the screen of the image display device 20.

In order to accurately recognize the user's hand 40 in the image 30, the virtual keyboard input unit 130 converts the RGB image received from the image capturing unit 110 into an HSV image, separates the intrinsic color of the skin based on the hue information of the converted HSV image, for example, Hue (H) and Saturation (S) information, searches for and separately extracts the hand region to creates a binarized image, and removes the noise (S20 to S40). The HSV image is a color expression image based on Hue, Saturation, and Value. Since HSV images are less affected by changes in lighting brightness than RGB images, when extracting a hand region based on HSV image, it is possible to prevent the hand region from being extracted incorrectly according to the lighting brightness. Noise reduction may be performed by normalizing an image after removing noise of a binary image using a morphology technique such as an erosion operation or an expansion/dilation operation.

Subsequently, the virtual keyboard input unit 130 extracts the feature of the hand from the normalized image to search for the position of the finger, tracks the position of the finger, and recognizes the hand gesture by analyzing the movement. In an embodiment, after finding a convex hull that includes the user's hand region (the outside of the hand), the virtual keyboard input unit 130 obtains convexity defects including depths between the fingers of the user and classifies the positions of the fingers (S50 to S60).

Figure 5:
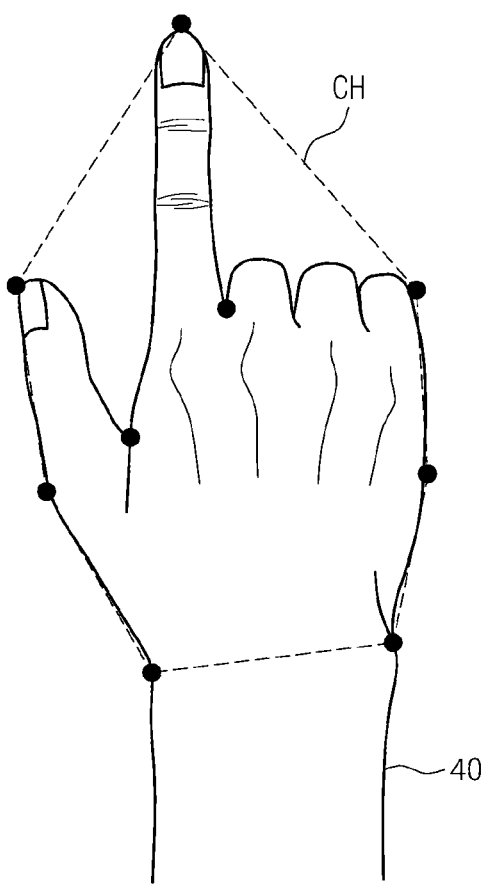
FIG. 5 is a view showing a convex hull extracted from a photographed image of a user's hand according to an embodiment of the present invention.
Figure 6:
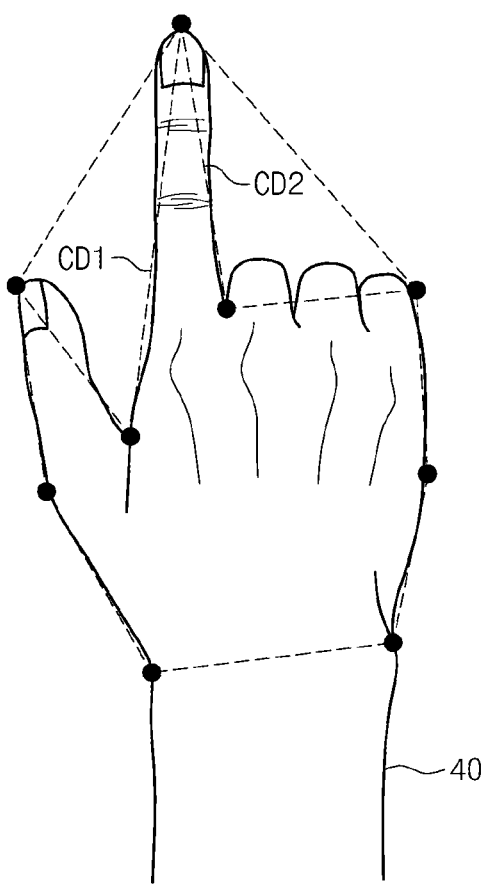
FIG. 6 is a view showing a convexity defect extracted from a photographed image of a user's hand according to an embodiment of the present invention.

FIG. 5 is a view showing a convex hull extracted from a photographed image of a user's hand according to an embodiment of the present invention. FIG. 6 is a view showing a convexity defect extracted from a photographed image of a user's hand according to an embodiment of the present invention. When the user makes a finger gesture such as moving, spreading or folding the fingers, the convex hull CH and the convexity defects CD1 and CD2 change according to the user's finger gesture.

The convex hull CH of the object corresponding to the hand is the smallest convex polygon including the given points and means the set of all convex combinations of the points included in the object. The virtual keyboard input unit 130 extracts boundary points from the convex hull CH of the user's hand 40 and tracks the position of the fingers and the number of the extended fingers based on the convexity defects CD1 and CD2 to recognize the finger gesture (S70).

When the user's finger gesture is recognized, the virtual keyboard input unit 130 outputs the keys of the virtual keyboard 50 based on the user's finger gestures (S80). The virtual keyboard input unit 130 may search the positions of the thumb and the index fingernail based on the outer edge of the hand and the position of the finger found by the convex hull and the convexity defect.

Figure 7:
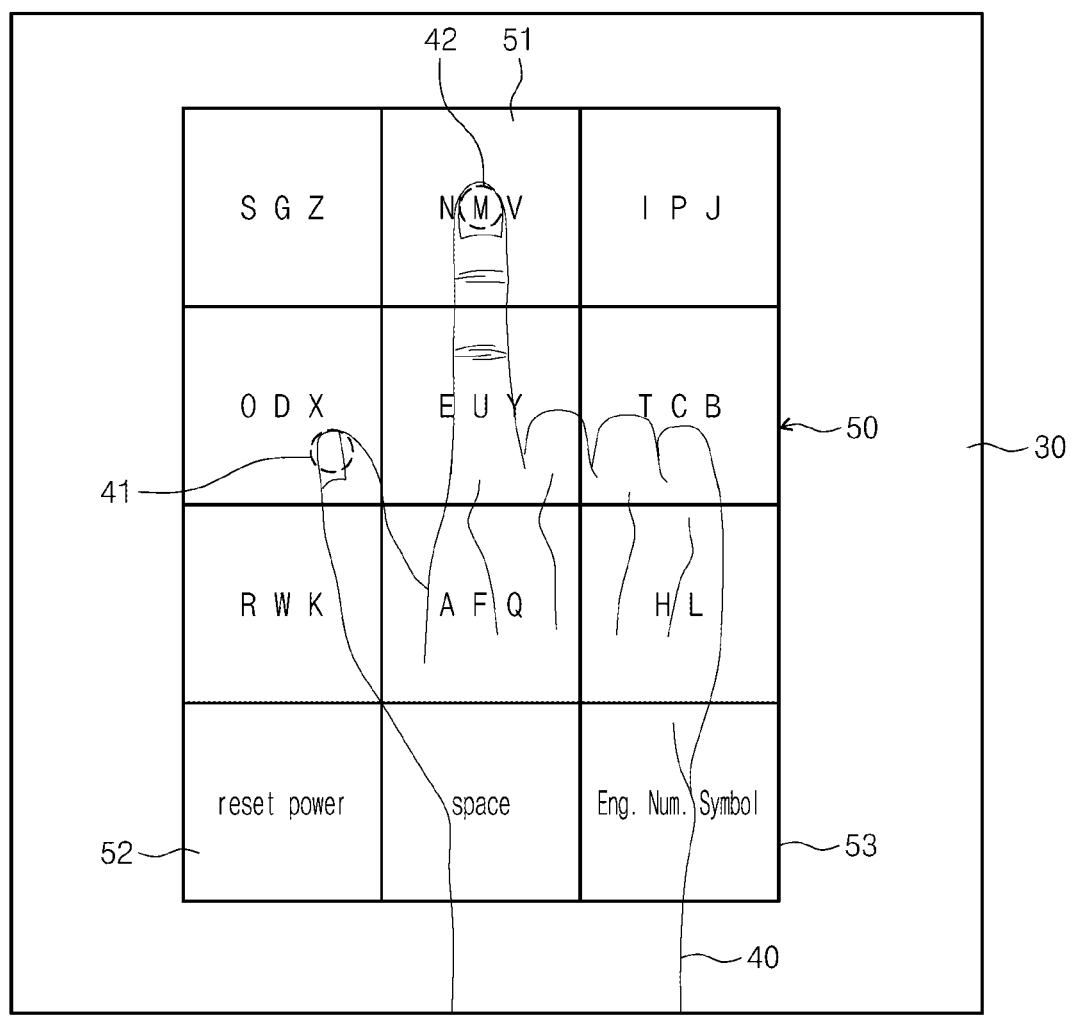
FIGS. 7 and 8 are exemplary diagrams showing a finger gesture for outputting a key of a virtual keyboard according to an embodiment of the present invention.
Figure 8:
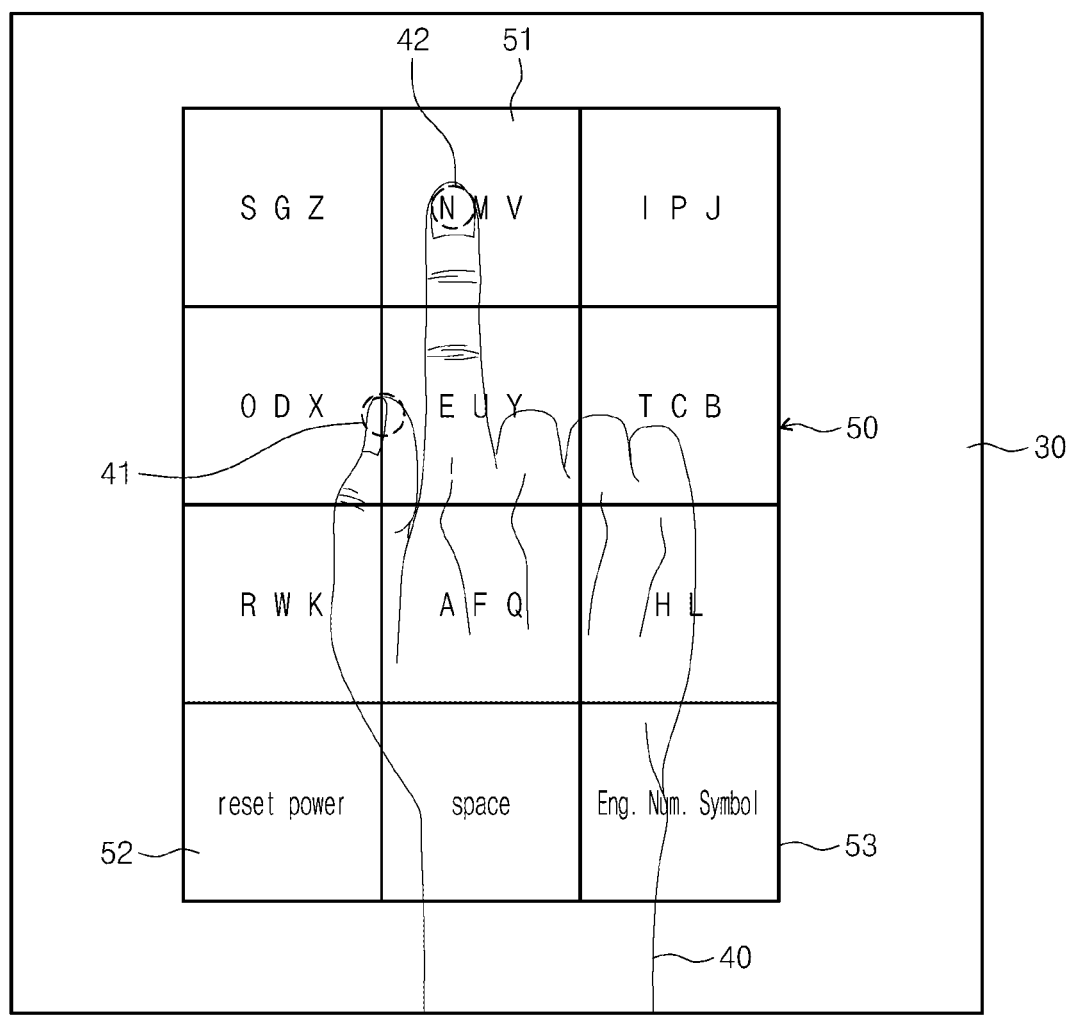

FIGS. 7 and 8 are exemplary diagrams showing a finger gesture for outputting a key of a virtual keyboard according to an embodiment of the present invention. As shown in FIG. 7, the user's finger gesture is in a state where the thumb 41 is not in contact with the index finger 42, and at this time, the key of the virtual keyboard 50 is not outputted. As shown in FIG. 8, when the user makes a finger gesture (click gesture) of allowing the thumb 41 to touch the side of the index finger 42, at that time, the key 51 (in the illustrated example, alphabet N) of the virtual keyboard 50 that overlaps with the end portion of the index finger 42 is outputted.

When details are described with reference to FIG. 6, the virtual keyboard input unit 130 may determine the fingernail position of the user's thumb 41, and calculate the distance between the fingernail position of the thumb 41 and the convexity defect CD1 between the thumb 41 and the index finger 42. The virtual keyboard input unit 130 may determine the click gesture based on the distance between the fingernail position of the thumb 41 and the convexity defect 41 between the thumb 41 and the index finger 42.

When the user makes a click gesture, since the fingernail position of the extended thumb reaches the middle of the index finger, if the distance between the thumbnail position of the thumb and the convexity defect between the thumb and index finger reaches the lowest point or falls below the set reference value, it can be determined that the user makes a finger gesture corresponding to the click gesture.

In the example shown in FIG. 8, if the user makes two consecutive click gestures at short intervals within the set time interval, the alphabet M corresponding to the second layer of the key 51 overlapping the end portion of the index finger 42 is outputted. Also, if the user makes three consecutive click gestures, the alphabet V corresponding to the third layer of the key 51 overlapping the end portion of the index finger 42 is outputted.

Figure 9:
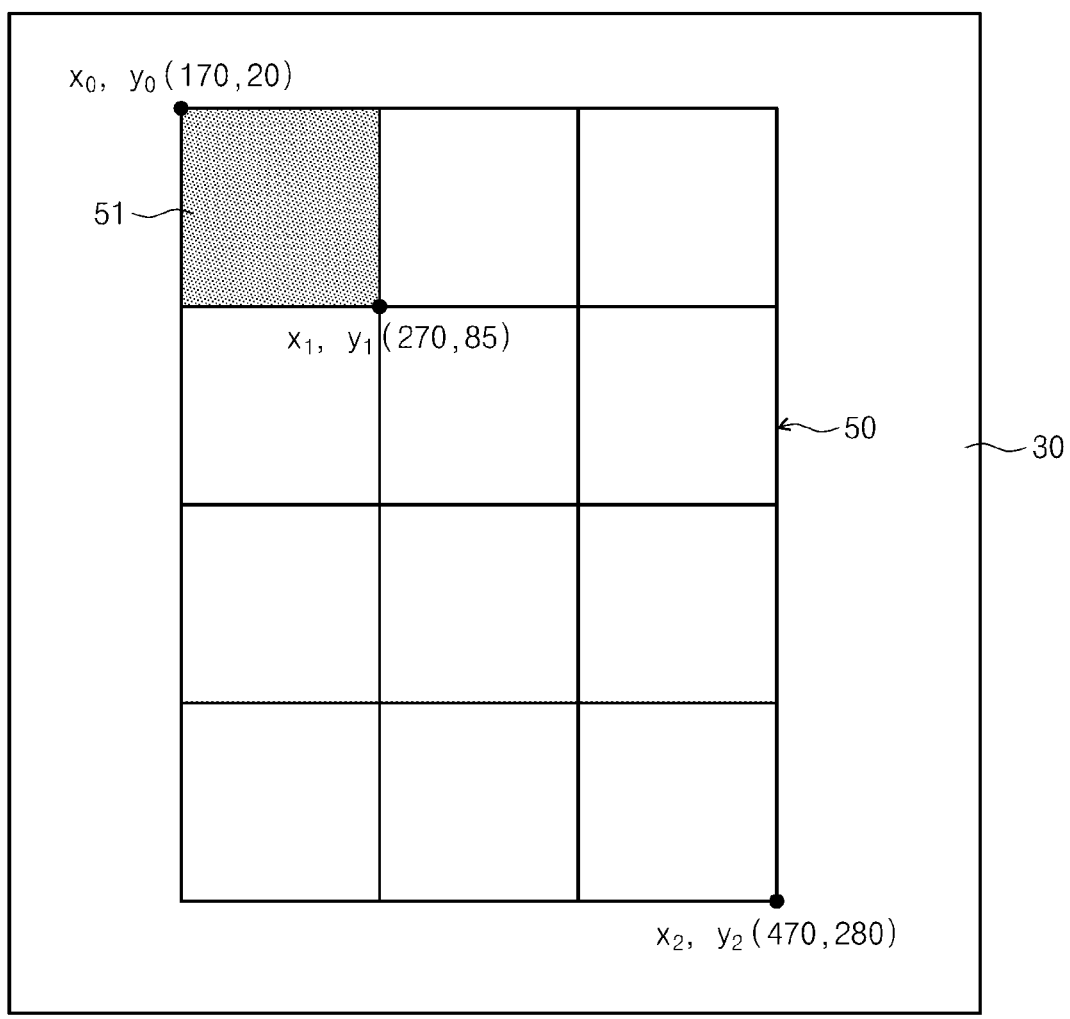
FIG. 9 is a view for explaining a method of overlapping a virtual keyboard on an image according to an embodiment of the present invention.

FIG. 9 is a view for explaining a method of overlapping a virtual keyboard on an image according to an embodiment of the present invention. Referring to FIG. 9, a key box outline of M×N pieces (12 in the example of FIG. 9) constituting the virtual keyboard 50 is displayed at set positions in the image 30. The size of each box may be set in consideration of the size of the finger when looking at the hand with the eyes of the user.

If the size of the key box is too small, the area that fingertips can point to becomes small, the fingers will be in an ambiguous position, resulting in increasing the chance of error. On the contrary, if the size of the key box is too large, the area occupied by the virtual keyboard 50 becomes large, so that the movement of the hand gesture for the input becomes large, thereby preventing the quick input.

In order to accurately recognize finger gestures by ensuring the perfect hand shape, the position of the virtual keyboard 50 displayed in the image 30 may be set so that an area of a minimum height or higher may be secured below the virtual keyboard 50. In a case where a certain area is not secured under the virtual keyboard 50, when inputting a key of a lower part of the virtual keyboard 50, since a part of the object corresponding to the hand is cut in the image 30, it may be difficult to recognize the correct finger gesture.

In relation to the virtual keyboard 50, an input area for letters, symbols, and/or numbers is given through positional coordinates of the keys. The edge portion for each key box can be divided into its own area for the position of the start and end of the key. In the example of FIG. 9, when a click gesture occurs in an area from the starting point x0, y0 (170,20) to the end point x1, y1 (270,85), the value corresponding to the position of the key in the corresponding area is outputted. By giving the coordinates for all the keys from x0, y0 (170,20) to x2, y2 (470,280), when a click gesture occurs for these areas, the key value of the corresponding area is outputted.

In the case where the virtual keyboard 50 includes a plurality of key boxes, at least one of the key boxes includes a multi-tap structure arranged in two or more layers, in order to enter letters belonging to the same key box consecutively, after entering the preceding letter, a user waits by the standby time (for example, 1 second or longer), and then enters subsequent letters so that the input time is delayed by the standby time.

In order to solve this problem, the virtual keyboard input unit 130 may further include a layer gesture determination unit (reference numeral 133 of FIG. 3). The layer gesture determination unit 133 may be configured to determine a set layer gesture from a user's finger gesture. The layer gesture determination unit 133 may be configured to calculate the number of fingers spread by the user when the click gesture occurs and to determine the layer gesture from the calculated number of fingers. The key output unit 135 may be configured to determine and output a layer corresponding to a layer gesture from a key having a multi-tap structure.

Figure 10:
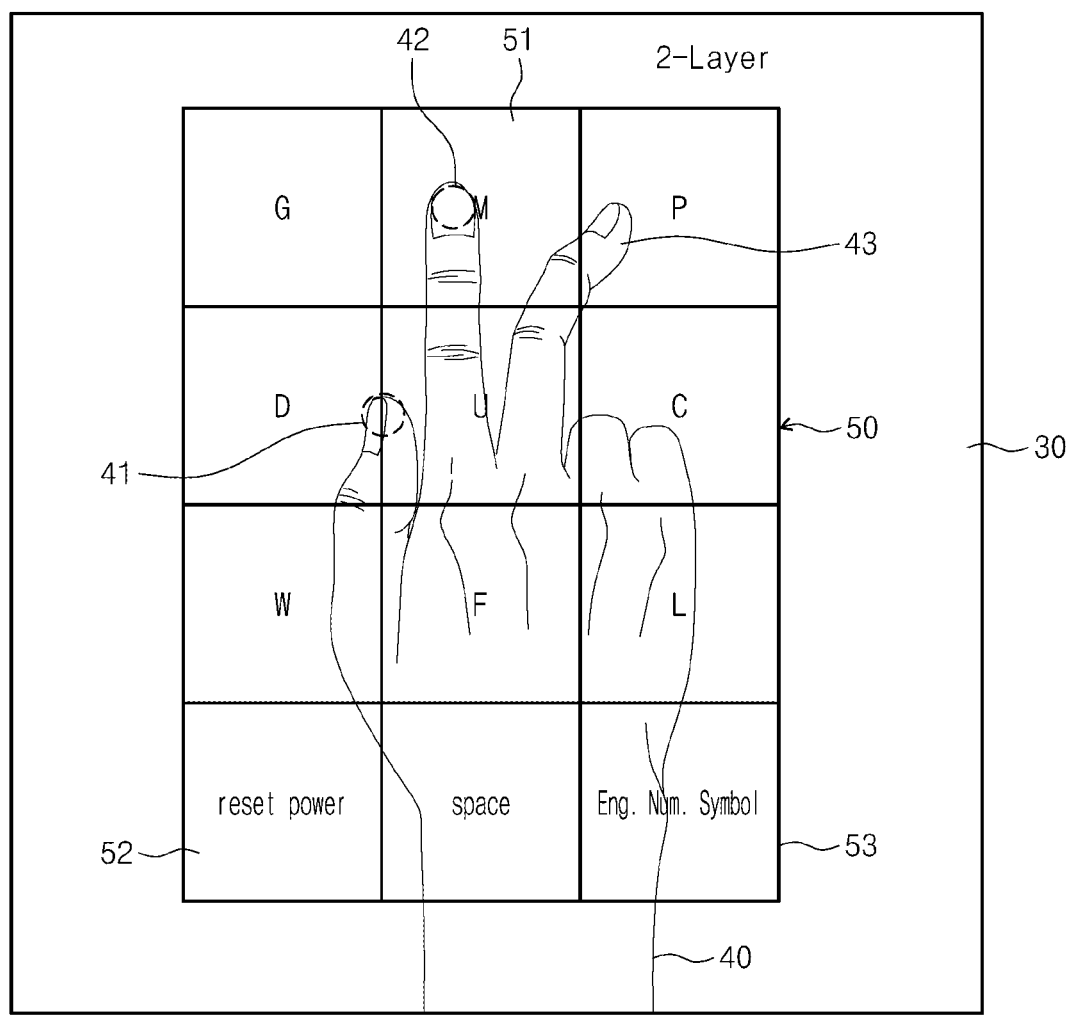
FIGS. 10 and 11 are views illustrating a finger gesture for outputting a key of a multi-tap structure arranged in a plurality of layers according to an embodiment of the present invention.
Figure 11:
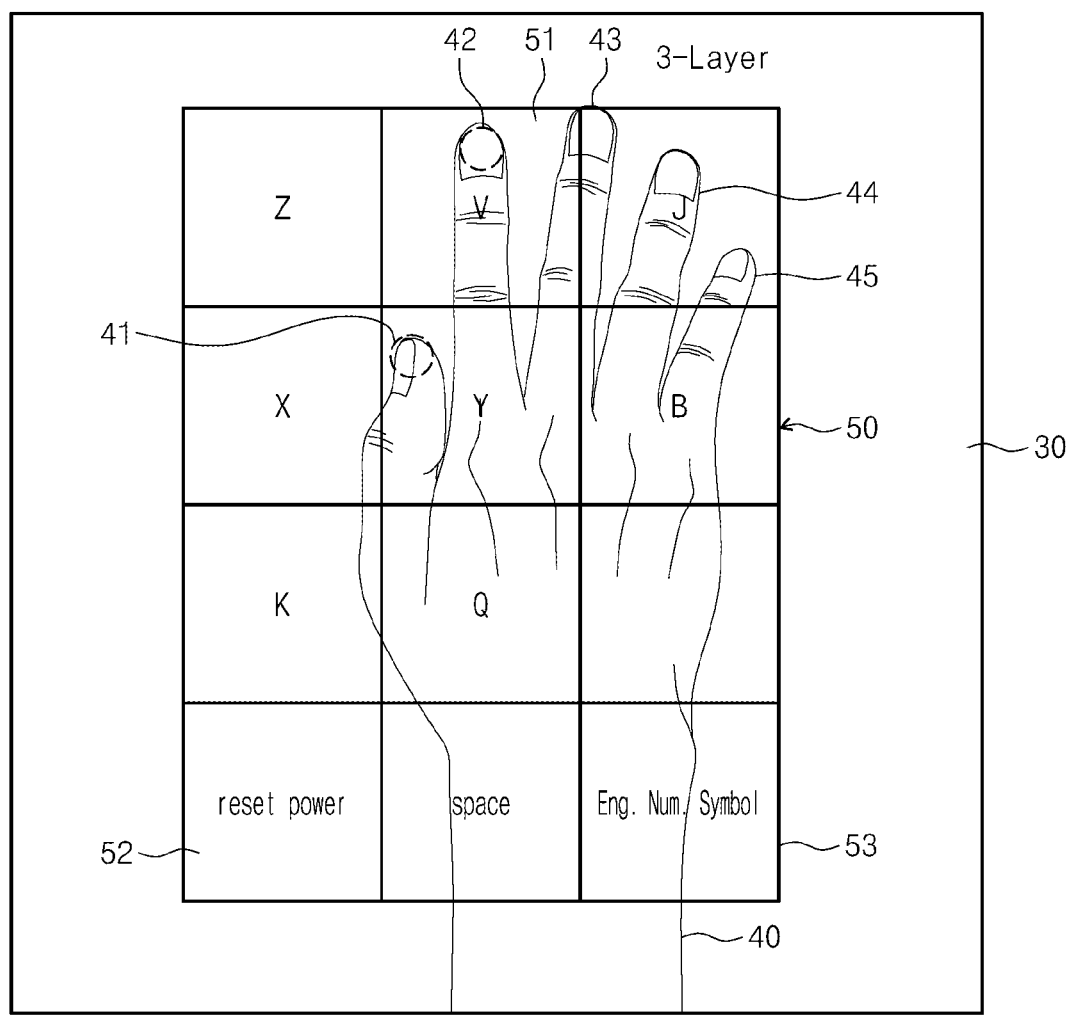

FIGS. 10 and 11 are views illustrating a finger gesture for outputting a key of a multi-tap structure arranged in a plurality of layers according to an embodiment of the present invention. As shown in FIG. 10, when the user makes a finger gesture that extends the middle finger 43 together with the index finger 42, the virtual keyboard input unit 130 may determine that two fingers among the four fingers except for the thumb 41 are extended, and when the thumb 41 is in contact with the index finger 42, may output the alphabet M of the second layer among the alphabets of the key 51 of the virtual keyboard 50 overlapping the end portion of the index finger 42.

Also, as shown in FIG. 11, when the user makes a finger gesture that extends all three or more of the four fingers except for the thumb 41, for example, the middle finger 43, the ring finger 44, and the little finger 45 together with the index finger 42, the virtual keyboard input unit 130 may output the alphabet V of the third layer among the alphabets of the key 51 of the virtual keyboard 50 overlapping the end portion of the index finger 42 when the thumb 41 is in contact with the index finger 42.

As shown in FIG. 8, when the user makes a finger gesture of extending only the index finger 42 among the four fingers excluding the thumb 41, and folding the middle finger 43, the ring finger 44, and the little finger 45, the virtual keyboard input unit 130 may determine the number of extended fingers as one, and output the alphabet N of the first layer among the alphabets of the key 51 of the virtual keyboard 50 overlapping the end portion of the index finger 42 when the thumb 41 is in contact with the index finger 42.

In such a manner, when determining the layer of the multi-tap key and outputting the key based on the user's layer gesture, it is unnecessary to click multiple times to output the second or third layer, and moreover, when it is necessary to enter letters, symbols or numbers belonging to the same key box consecutively, it is possible to enter letters, symbols or numbers consecutively without waiting. For example, if wanting to enter the alphabet 'NMV' consecutively, the user may enter the alphabet N by performing a finger gesture (first layer gesture) as shown in FIG. 8, and after inputting the alphabet M by performing a finger gesture (second layer gesture) as shown in FIG. 10 without waiting for the standby time, input the alphabet V by performing a finger gesture (third layer gesture) of FIG. 11 instead of waiting for the standby time again.

Therefore, according to this embodiment, by determining and outputting the layer of the multi-tap key based on the layer gesture recognition, even in a case of entering letters, numbers and/or symbols in the same key box consecutively, since an input is possible without a standby time, the input time of letters, numbers and/or symbols can be shortened.

In an embodiment, the virtual keyboard 50 may include a reset/power key 52 and a switch key 53. When the user inputs the reset/power key 52 by a finger gesture, the user can reset or turn off the power. When the user inputs the switch key 53 by a finger gesture, the virtual keyboard 50 may be switched between the letter, number, and/or symbol keys.

Referring to FIGS. 1 and 3 again, the virtual keyboard input unit 130 may further include a grab gesture determination unit 134. The grab gesture determination unit 134 may be configured to determine whether a user's finger gesture corresponds to a set grab-gesture.

Figure 12:
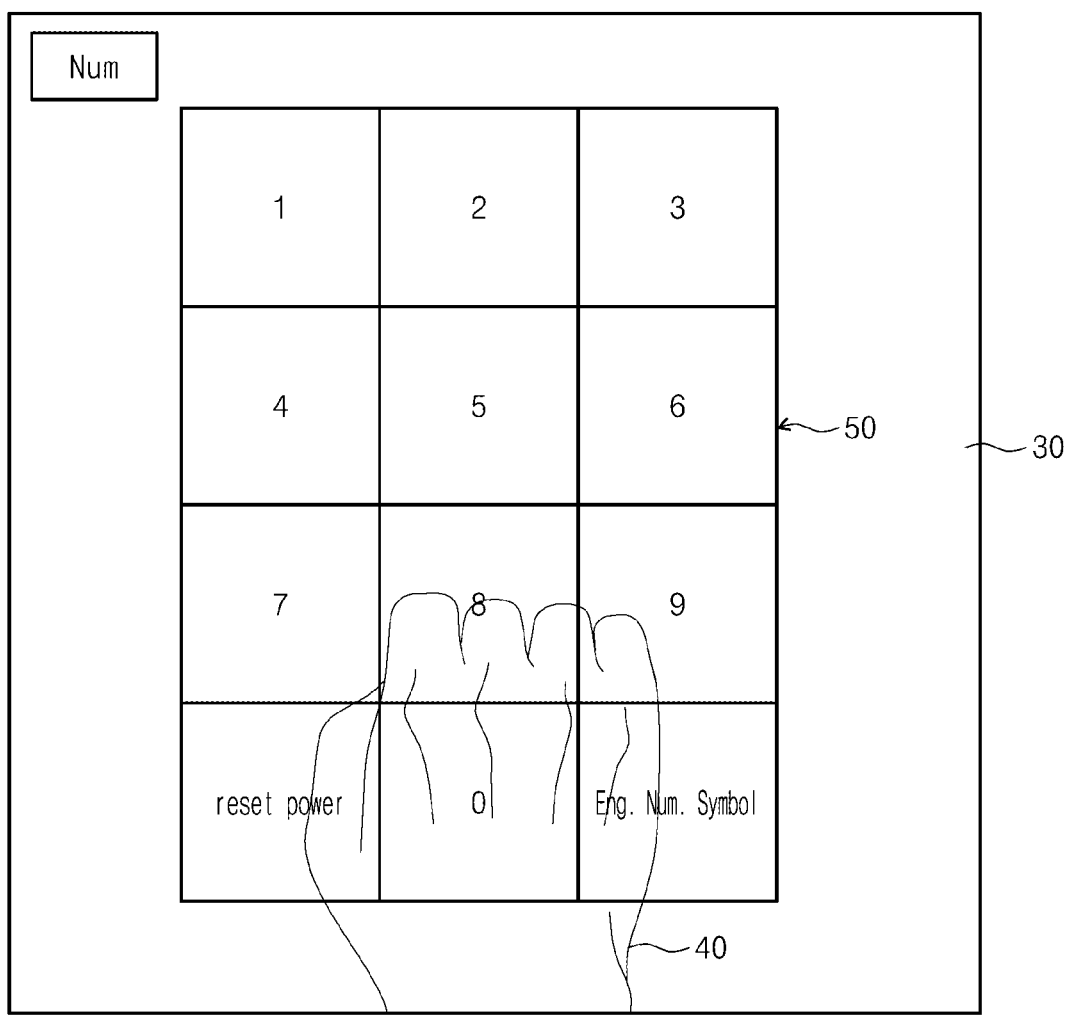
FIGS. 12 and 13 are views illustrating a finger gesture for switching keys of a virtual keyboard based on a grab gesture according to an embodiment of the present invention.
Figure 13:
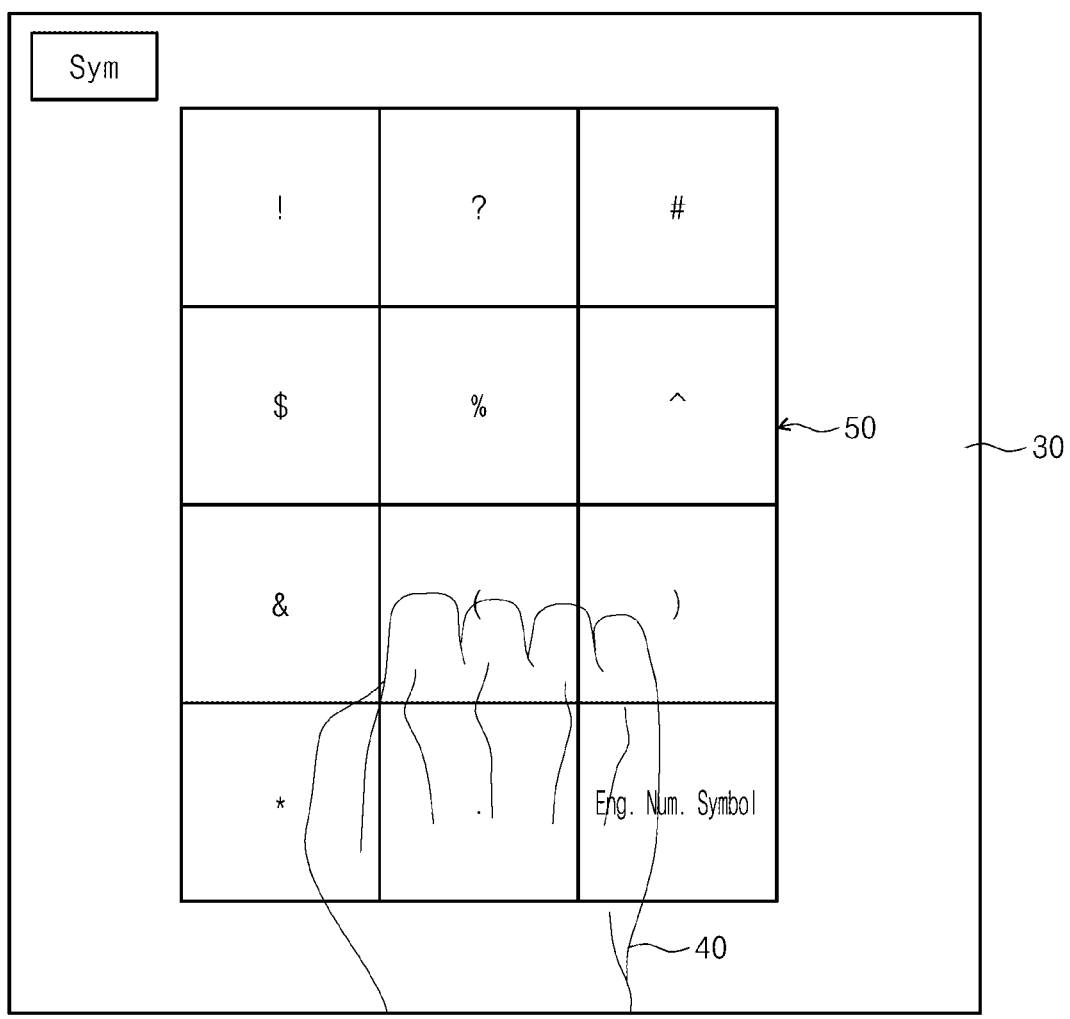

FIGS. 12 and 13 are views illustrating a finger gesture for switching keys of a virtual keyboard based on a grab gesture according to an embodiment of the present invention. Referring to FIGS. 1, 3, 12 and 13, the grab gesture determination unit 134 may determine that a user's gesture corresponds to the grab gesture when the user makes a finger gesture in the state of the closed first with all fingers folded, or when a user moves a hand in a set direction in the state of the closed first.

If it is determined that the user's finger gesture corresponds to the grab gesture, as shown in FIGS. 12 and 13, the virtual keyboard display unit 120 may be configured to switch and display keys of the virtual keyboard 50 between a plurality of key types including at least two of letters, numbers, and symbols.

According to the keyboard input system and method according to an embodiment of the present invention, in various environments such as augmented reality, the user's various finger gestures are recognized from the video images obtained by the camera so that key input is convenient using a virtual keyboard displayed on the display screen without a separate keyboard or mouse. In addition, without additional equipment such as gloves and markers, it is possible to input the key of the virtual keyboard only by the user's finger gesture.

FIGS. 14 and 15 illustrate other examples of a virtual keyboard provided by a keyboard input method according to an embodiment of the present invention. As illustrated in FIGS. 14 and 15, the virtual keyboard may have various key arrangements, such as 4×4 and 4×5, in addition to the 3×4 key arrangement. In addition, the virtual keyboard 50 may be arranged with a single layer of keys as well as a multi-tap structure including a plurality of letters, symbols, and numbers having several layers in one key 51.

Referring again to FIGS. 1 and 2, the keyboard input system 100 may further include a key arrangement determination unit 140. The key arrangement determination unit 140 may be configured to determine the arrangement of the keys of the virtual keyboard 50 that can be inputted faster based on the finger gesture. In an embodiment, the key arrangement determination unit 140 may determine the key arrangement of the virtual keyboard based on the frequency of use of the keys in predetermined words or sentences and the adjacency (correlation) frequency between the keys in the words or sentences.

In an embodiment, when inputting words or sentences, the key arrangement determination unit 140 may calculate an input time of words based on user's finger movement distance, key input time, and standby time according to continuous input of multi-tap keys, and determine an arrangement of keys to minimize the input time.

When arranging keys optimally to allow a key placement between letters with high correlation to be close, it is possible to reduce the overall input time for sentence input. In other words, in a keyboard input system based on finger gesture recognition, in consideration of the frequency of letters and the correlation frequency of consecutive letters, the input time can be shortened by optimizing the arrangement of the keys to minimize the traveling distance between the keys.

In order to increase the accuracy of virtual keyboard input using finger gesture recognition, instead of reducing the number of keys such as a 3×4 arrangement or the like, it is desirable to apply a multi-tap method to reduce the error rate by securing a key size of more than a certain level and to place two or three letters in one key.

In consideration of the frequency of use of alphabets and the correlation (adjacency) frequency between alphabets included in sentences of E-book (e.g., 20,000 Leagues Under the Sea by Jules Verne; E-book1, Les Miserables by Victor Hugo; E-book2, and the like), it is possible to simulate the arrangement of keys to minimize the traveling distance between keys and the number of clicks for multi-tap input during letter input.

For example, in the case of alphabets with a large appearance frequency, the traveling distance between the keys can be shortened and the input time can be shortened by being placed at the center position of the virtual keyboard. When arranging alphabets with high correlation frequency as close as possible, the input time can be further reduced. Correlation frequency can be obtained by using E-book1, E-book2, and the like to obtain the frequency between adjacent alphabets. Through repeated click gesture experiments, the weight for the input time is reflected according to the traveling distance between keys.

Figure 16:
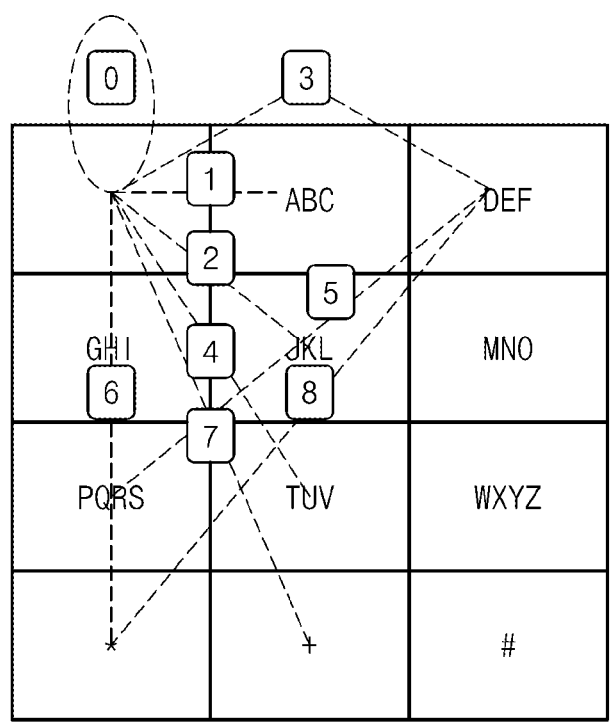
FIG. 16 is a diagram illustrating a serial number assigned to each traveling distance between keys of a virtual keyboard.

FIG. 16 is a diagram illustrating a serial number assigned to each traveling distance between keys of a virtual keyboard. In the case of a repeated click of the same key, the serial number according to the traveling distance is set to 0, and serial numbers from 1 to 8 are assigned in the order of the distance between the keys. In the click gesture experiments for serial numbers 0 to 8, the weights were measured as 0.488 (sec), 0.593 (sec), 0.607 (sec), 0.684 (sec), 0.825 (sec), 0.884 (sec), 0.907 (sec), 0.933 (sec), and 0.960 (sec), respectively. Multi-tap standby time according to continuous input for the same key was 1,800 (sec), which means that it takes a lot of time. Therefore, in the case of the multi-tap virtual keyboard, it is desirable to optimize the key arrangement of the virtual keyboard so that alphabets having a high correlation frequency probability are not arranged in the same key.

In the embodiments without a layer gesture based virtual keyboard input function, if the input text is on the second/third layer rather than the first layer, since a user has to make two or three click gestures, the time it takes to click in place also varies. Accordingly, the optimal key arrangement can be calculated by calculating the input time by including the time required for the in-place click of the multi-tap arrangement in the weighting factor.

When the time it takes to click in place with the thumb is defined as C, the time it takes to move from the previous key (i) to the next key (j) is defined as D (i,j), and the standby time to continuously input alphabets in the same alphabet or the same key is defined as W, the virtual keyboard input time Ttot may be calculated by Equation 1 below.

$$Ttot = \sum_{k=0}^{t}(D(i,j) + C*n + W) \qquad \text{[Equation 1]}$$

In order to calculate the input time for all combinations of 26 alphabets, since we need to calculate the input time for the combinations of 26!, the simulation is time consuming and inefficient. Therefore, since the alphabets with the highest frequency have the greatest effect during the entire input time, and the arrangement of the alphabet with the low frequency has a small effect on the input time, the input time can be simulated by dividing them into a plurality of groups (for example, 3 groups) for each layer based on the frequency of the alphabet.

By simulating the number of cases for each layer in three groups divided by frequency, among them, the alphabet arrangement that performs the minimum time can be determined as the key arrangement of the virtual keyboard. If the performance is made in such a manner, the first layer and the second layer composed of nine alphabets can be simulated for 9! (362,880) combinations, respectively, and the third layer composed of eight alphabets can be simulated for 8! (40,320) combinations, respectively. In this case, the virtual keyboard may be optimized to have a key arrangement having the smallest input time among 766,080 (9!×2+8!) combinations of the first, second, and third layers of the simulation model.

Figure 17:
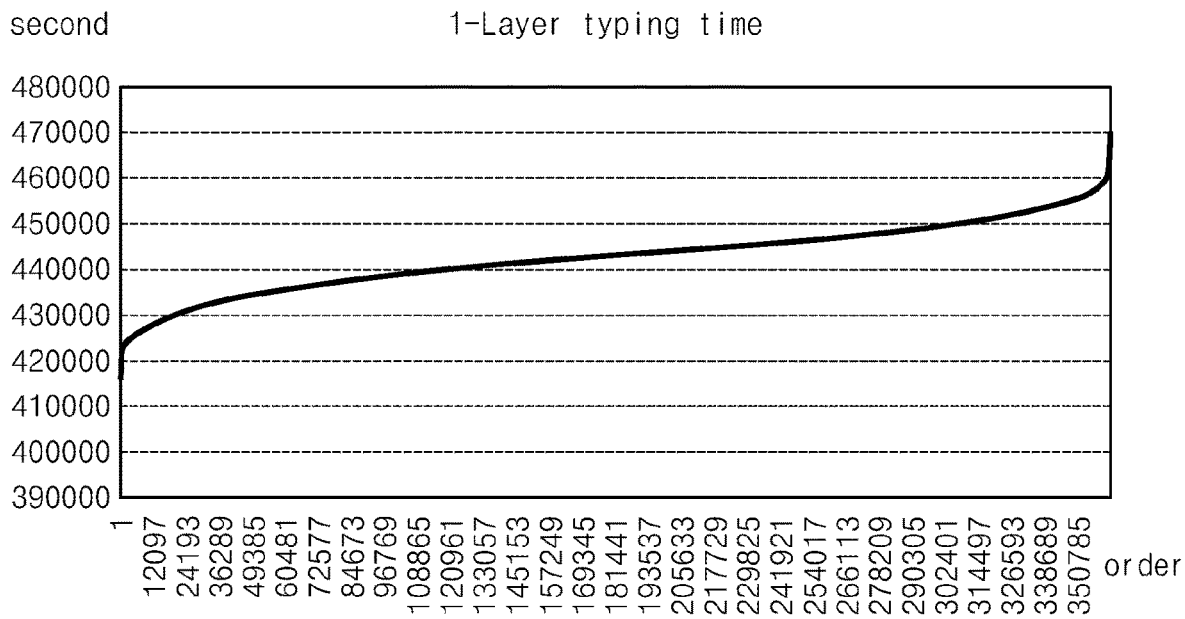
FIGS. 17 to 19 are views illustrating that the virtual keyboard input time is simulated for the combination of alphabets of the first, second, and third layers, respectively, and is sorted in order of input time.
Figure 18:
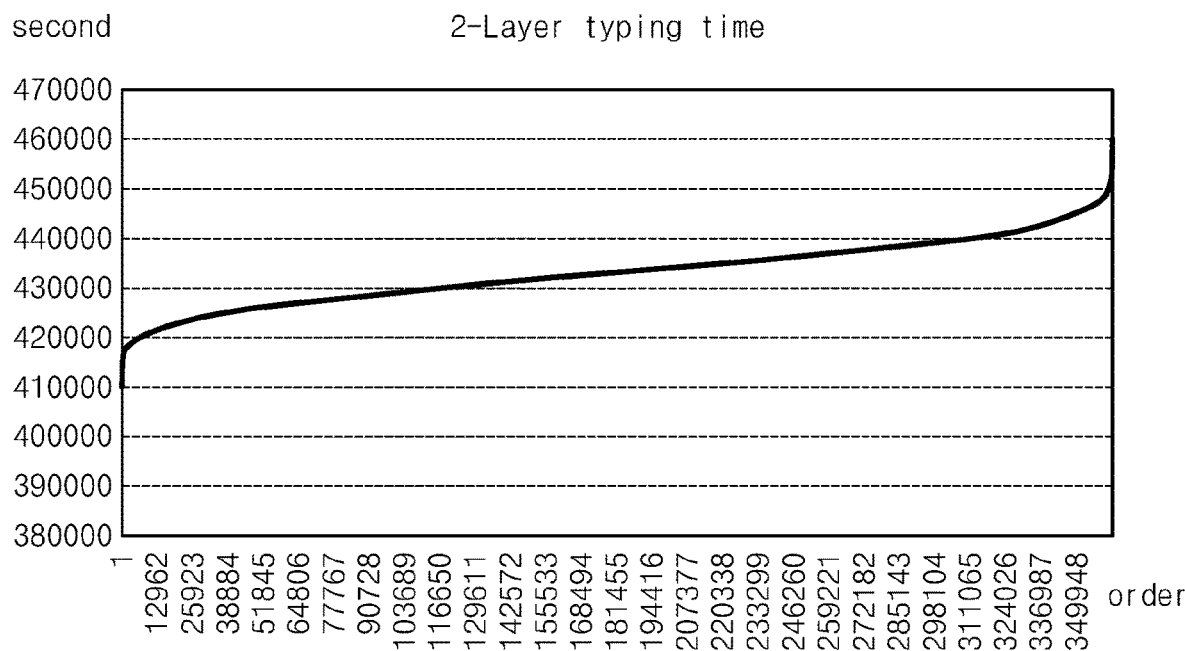
Figure 19:
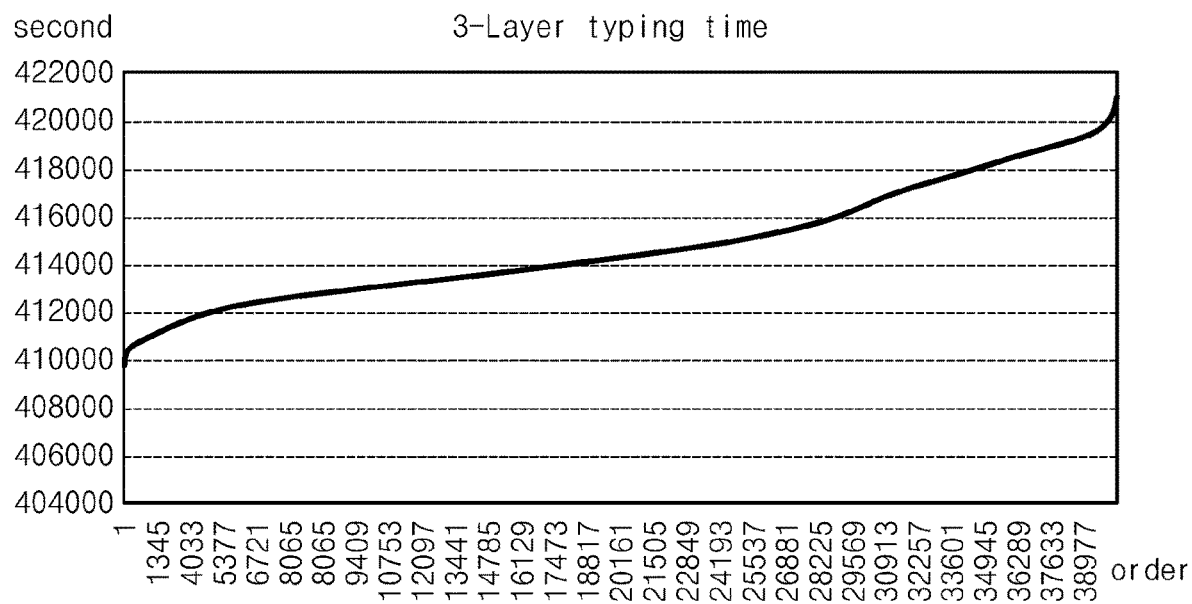

The nine alphabets to be arranged in the first layer are selected as ETAOHINSR, the nine alphabets to be arranged in the second layer are selected as DLUCMWFGP, and the remaining eight alphabets YBVKJXQZ are arranged in the third layer to calculate the input time. In FIGS. 17 to 19, the virtual keyboard input time is simulated for the combination of alphabets of the first, second, and third layers, respectively, and is sorted in order of input time. The alphabet arrangement representing the smallest input time in the first layer is SNIOETRAH.

With the alphabet arrangement of the first layer set to the arrangement representing the smallest input time, the combination of the alphabets in the second layer is simulated and the alphabet arrangement representing the smallest input time in the second layer is GMPDUCWFL. In the same manner, with the alphabet arrangements of the first and second layers set to the arrangements representing the smallest input time, the combination of the alphabets in the third layer is simulated and the alphabet arrangement representing the smallest input time in the third layer is ZVJXYBKQ.

Figure 20:
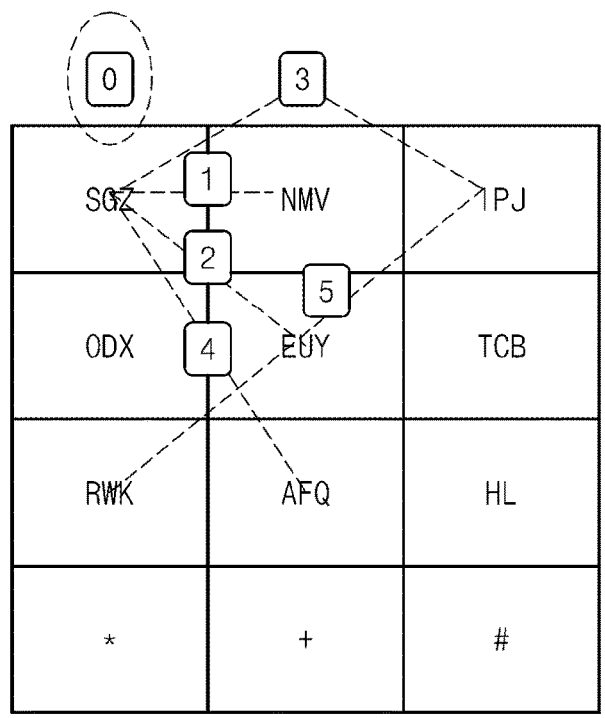
FIG. 20 is a diagram illustrating serial numbers assigned to each traveling distance between keys of a virtual keyboard having a layer gesture recognition function.
Figure 21:
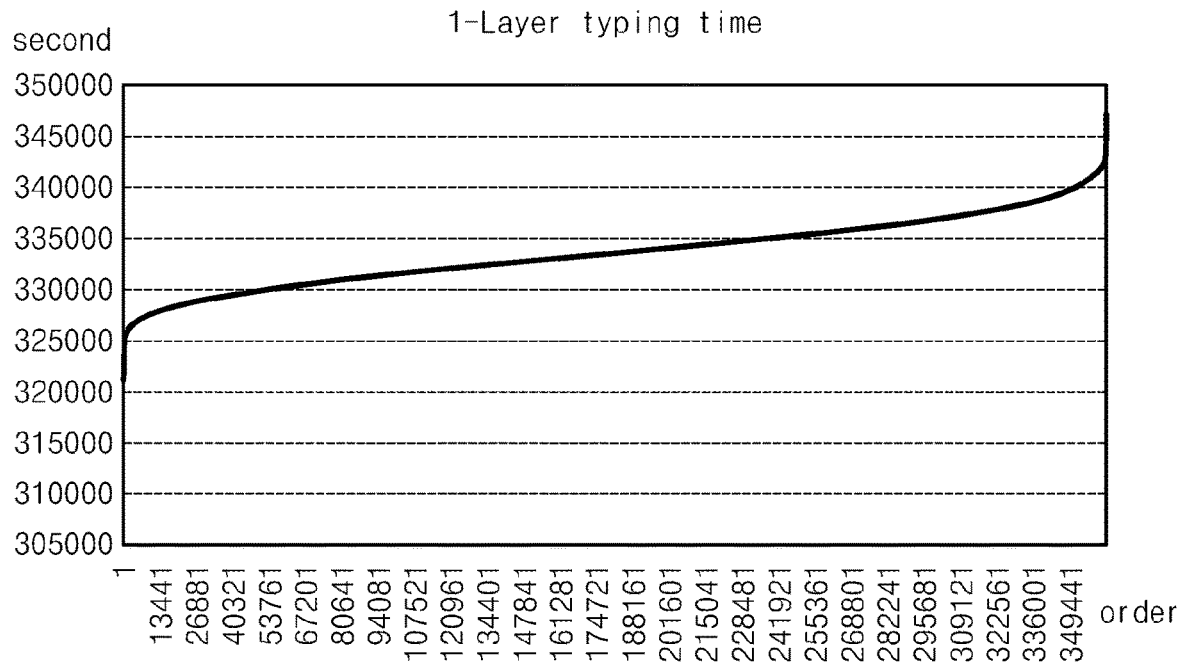
FIGS. 21 to 23 are views illustrating that the input time of a virtual keyboard with a layer gesture recognition function is simulated for the combination of alphabets of the first, second, and third layers, respectively, and is sorted in order of input time.
Figure 22:
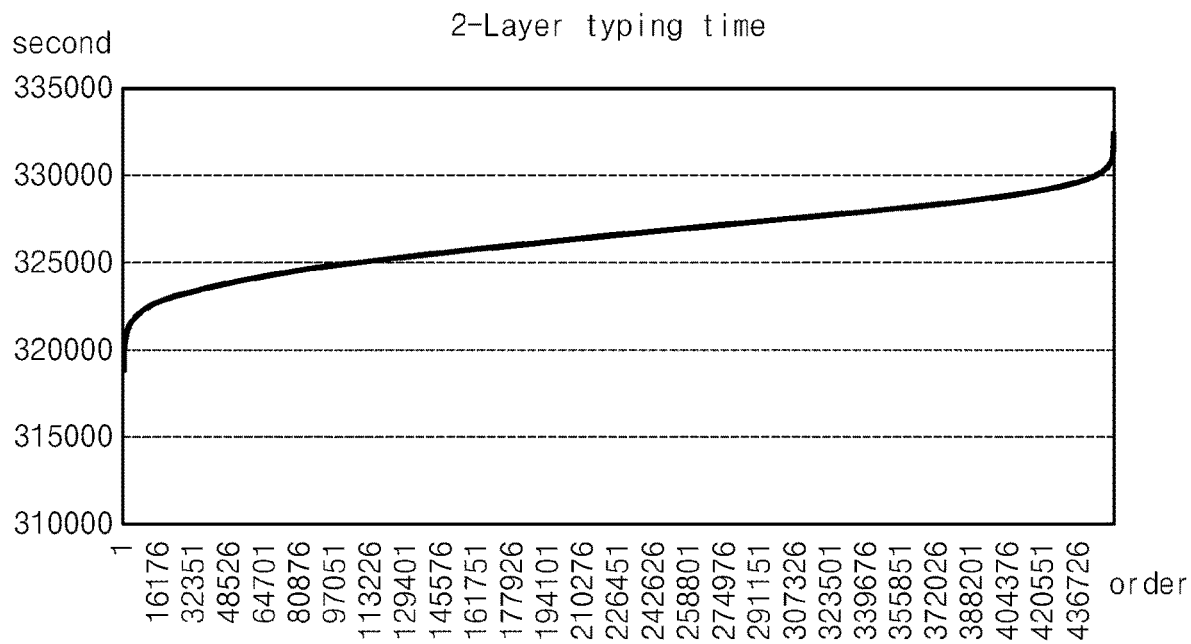
Figure 23:
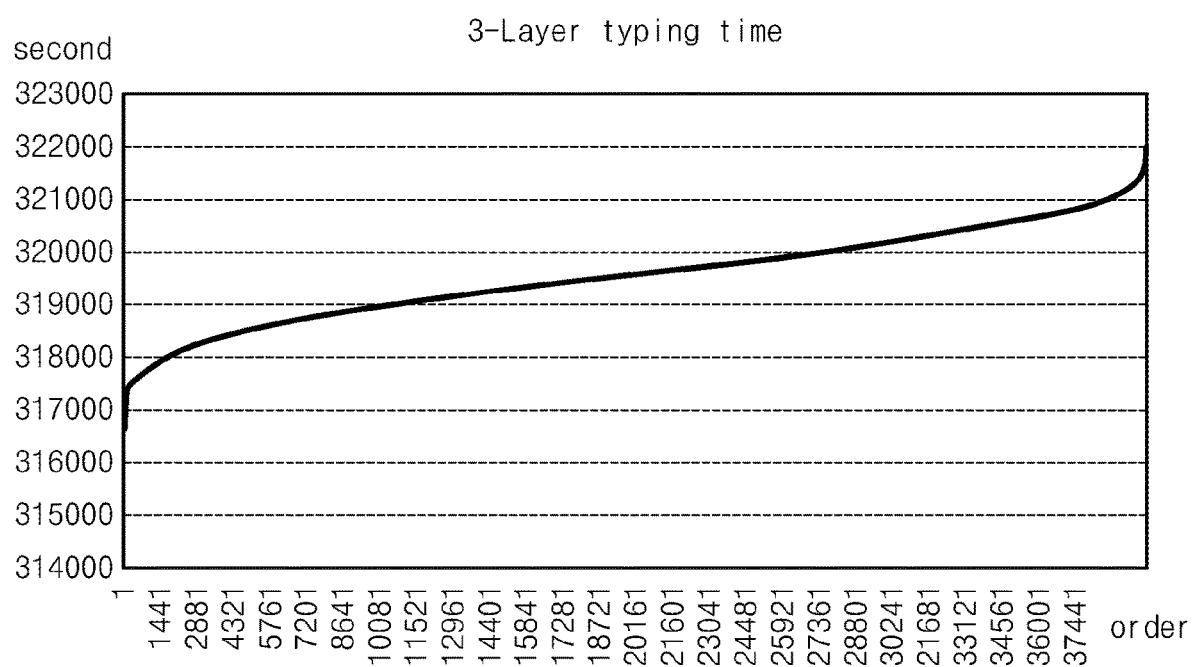

FIG. 20 is a diagram illustrating serial numbers assigned to each traveling distance between keys of a virtual keyboard having a layer gesture recognition function. In FIGS. 21 to 23, the input time of a virtual keyboard with a layer gesture recognition function is simulated for the combination of alphabets of the first, second, and third layers, respectively, and is sorted in order of input time. Except for calculating the input time when outputting the key by recognizing the layer based on the number of fingers, the simulation was performed in the same manner as in FIGS. 17 to 19.

FIG. 24 is a diagram illustrating an arrangement of keys optimized for a virtual keyboard having a layer gesture recognition function. In the case of a virtual keyboard with layer gesture recognition, the alphabet arrangement representing the smallest input time in the first layer is OARNTEISH, the alphabet arrangement representing the smallest input time in the second layer is UPMGLDFCW, and the alphabet arrangement representing the smallest input time in the third layer is QBJXYVZK. From this, as shown in FIG. 24, the key arrangement of the virtual keyboard optimized to have the minimum input time can be determined.

The keyboard input system and keyboard input method using finger gesture recognition according to an embodiment of the present invention can be used as a control and input interface for augmented reality applications and can be applied to various environments so that a user can conveniently use various contents information such as SMS message, SNS service, web surfing, etc., and can be applied to the field of wearable computer, computer vision, wearable display, and the like.

The method according to an embodiment of the present invention can be written as a program that can be executed, for example, on a computer and can be implemented in a general-purpose digital computer for operating the program using a computer-readable recording medium. The computer-readable recording media may be volatile memory such as static RAM (SRAM), dynamic RAM (DRAM), synchronous DRAM (SDRAM), and the like, nonvolatile memory such as Read Only Memory (ROM), Programmable ROM (PROM), Electrically Programmable ROM (EPROM), Electrically Erasable and Programmable ROM (EEPROM), flash memory device, Phase-change RAM (PRAM), Magnetic RAM (MRAM), Resistive RAM (RRAM), Ferroelectric RAM (FRAM), and the like, floppy disk, hard disk, or optical storage medium, for example, a storage medium in the form of CD-ROM, DVD, and the like, but is not limited thereto.

The above embodiments are presented to help the understanding of the present invention, and do not limit the scope of the present invention. Therefrom, it should be understood that various modifications are within the scope of the present invention. The technical protection scope of the present invention should be determined by the technical spirit of the claims. It should be understood that the technical protection scope of the present invention is not limited to the literary description of the claims per se, but that the technical values substantially extend to the invention of equivalent scope.

The invention claimed is:

1. A keyboard input system comprising:
a virtual keyboard display unit configured to overlap and display a virtual keyboard having keys on a hand image obtained by an image capturing unit; and
a virtual keyboard input unit configured to output a key of the virtual keyboard based on a user's finger gesture recognized in the hand image,
wherein the virtual keyboard input unit comprises:
a finger recognition unit configured to recognize a finger gesture of the user in the hand image;
a click gesture determination unit configured to determine whether the finger gesture corresponds to a predetermined click gesture; and
a key output unit configured to determine a key overlapping with a predetermined finger position of the user when the click gesture occurs,
wherein the click gesture comprises an interaction between two fingers of the user, and
wherein one finger contacts or approaches the other finger during the click gesture.

2. The keyboard input system of claim 1, wherein the click gesture is an operation in which the thumb of the user contacts or approaches the index finger, and the predetermined finger position is a position of an end portion of the index finger of the user.

3. A keyboard input system comprising
a virtual keyboard display unit configured to overlap and display a virtual keyboard having keys on a hand image obtained by an image capturing unit, and
a virtual keyboard input unit configured to output a key of the virtual keyboard based on a user's finger gesture recognized in the hand image,
wherein the virtual keyboard input unit comprises:
a finger recognition unit configured to recognize a finger gesture of the user in the hand image;
a click gesture determination unit configured to determine whether the finger gesture corresponds to a predefined click gesture; and
a key output unit configured to determine a key overlapping with a predetermined finger position of the user when the click gesture occurs,
wherein the click gesture comprises an interaction between at least two fingers of the user, and
wherein the finger recognition unit is configured to:
obtain a convex hull including a hand region of the user;
obtain convexity defects including depth information between the user's fingers; and
track a finger position based on boundary points extracted from the convex hull of the hand region and the convexity defect.

4. The keyboard input system of claim 3, wherein the click gesture determination unit is configured to:
- determine a fingernail position of the user's thumb;
- calculate a distance between a fingernail position of the thumb and a convex defect between the user's thumb and index finger; and
- determine the click gesture based on the distance between the thumbnail position of the thumb and the convexity defect.

5. A keyboard input system comprising:
- a virtual keyboard display unit configured to overlap and display a virtual keyboard having keys on a hand image obtained by an image capturing unit; and
- a virtual keyboard input unit configured to output a key of the virtual keyboard based on a user's finger gesture recognized in the hand image,
- wherein the virtual keyboard input unit comprises:
  - a finger recognition unit configured to recognize a finger gesture of the user in the hand image;
  - a click gesture determination unit configured to determine whether the finger gesture corresponds to a predefined click gesture; and
  - a key output unit configured to determine a key overlapping with a predetermined finger position of the user when the click gesture occurs,
- wherein the click gesture comprises an interaction between at least two fingers of the user,
- wherein the virtual keyboard comprises a plurality of key boxes, and at least one of the key boxes is provided as a multi-tap key in which keys are arranged as a plurality of layers,
- wherein the virtual keyboard input unit further comprises a layer gesture determination unit configured to determine a predetermined layer gesture from the user's finger gesture, and
- wherein the key output unit is configured to determine a key of a layer corresponding to the layer gesture among the multi-tap keys.

6. The keyboard input system of claim 5, wherein the layer gesture determination unit is configured to calculate the number of fingers extended by the user when the click gesture occurs, and determine the layer gesture based on the number of fingers.

7. The keyboard input system of claim 6, wherein the layer gesture determination unit is configured to:
- when the user extends only the index finger among four fingers except for the thumb, determine as a first layer gesture; and
- when the user extends only the index finger and the middle finger among four fingers except for the thumb, determine as a second layer gesture,
- wherein the key output unit is configured to:
  - when the user's finger gesture corresponds to the first layer gesture, output a key of a first layer of the multi-tap key; and
  - when the user's finger gesture corresponds to the second layer gesture, output a key of a second layer of the multi-tap key.

8. The keyboard input system of claim 1, wherein the virtual keyboard input unit further comprises a grab gesture determination unit configured to determine whether the user's finger gesture corresponds to a predetermined grab gesture,
- wherein when the finger gesture corresponds to a grab gesture, the virtual keyboard display unit is configured to switch and display keys of the virtual keyboard among a plurality of key types including at least two of letters, numbers, and symbols.

9. The keyboard input system of claim 1, further comprising a key arrangement determination unit configured to determine a key arrangement of the virtual keyboard based on an appearance frequency of keys in predetermined words or sentences, and an adjacency frequency between the keys in the words or sentences.

10. The keyboard input system of claim 9, wherein the key arrangement determination unit is configured to calculate an input time of the words or sentences based on a user's finger traveling distance, a key input time, and a standby time according to continuous input of a multi-tap key when the words or sentences are inputted to the virtual keyboard, and determine the arrangement of the keys such that the input time is minimum.

11. A keyboard input method comprising:
- overlapping and displaying a virtual keyboard having keys on a hand image obtained by an image capturing unit; and
- outputting a key of the virtual keyboard based on a user's finger gesture recognized in the hand image,
- wherein the outputting of the key comprises:
  - recognizing a finger gesture of the user in the hand image and determining whether the finger gesture corresponds to a predetermined click gesture; and
  - determining a key overlapping with a predetermined finger position of the user when the click gesture occurs,
- wherein the click gesture comprises an interaction between two fingers of the user, and
- wherein one finger contacts or approaches the other finger during the click gesture.

12. The method of claim 11, wherein the click gesture is an operation in which the thumb of the user contacts or approaches the index finger, and the predetermined finger position is a position of an end portion of the index finger of the user.

13. The method of claim 11, further comprising determining whether the user's finger gesture corresponds to a predetermined grab gesture,
- wherein the overlapping and displaying of the virtual keyboard comprises, when the finger gesture corresponds to the predetermined grab gesture, switching and displaying keys of the virtual keyboard among a plurality of key types including at least two of letters, numbers, and symbols.

14. The method of claim 11, further comprising determining a key arrangement of the virtual keyboard based on a frequency of keys in words or sentences, and an adjacency frequency between the keys in the words or sentences.

15. The method of claim 14, wherein the determining of the key arrangement of the virtual keyboard comprises calculating an input time of the words or sentences based on a user's finger traveling distance between keys, an input time of keys, and a standby time according to continuous input of a multi-tap key when the words or sentences are inputted to the virtual keyboard, and determining the arrangement of the keys such that the input time is minimum.

16. A computer-readable non-transitory recording medium having recorded thereon a program for executing the keyboard input method according to claim 11.

17. A keyboard input method comprising:
- overlapping displaying a virtual keyboard having keys on a hand image obtained by an image capturing unit; and
- outputting a key of the virtual keyboard based on a user's finger gesture recognized in the hand image, wherein the outputting of the key comprises:
  recognizing a finger gesture of the user in the hand image and determining whether the finger gesture corresponds to a predetermined click gesture; and
  determining a key overlapping with a predetermined finger position of the user when the click gesture occurs,
wherein the click gesture comprises an interaction between at least two fingers of the user, and
wherein the determining of whether the finger gesture corresponds to the predetermined click gesture comprises:
  obtaining a convex hull including a hand region of the user;
  obtaining convexity defects including depth information between the user's fingers;
  tracking a finger position based on boundary points extracted from the convex hull of the hand region and the convexity defect;
  determining a fingernail position of the user's thumb from the tracked finger position;
  calculating a distance between the fingernail position of the thumb and the convex defect between the thumb and the index finger; and
  determining the click gesture based on the distance between the thumbnail position of the thumb and the convexity defect between the thumb and the index finger.

18. A keyboard input method comprising:
  overlapping displaying a virtual keyboard having keys on a hand image obtained by an image capturing unit; and
  outputting a key of the virtual keyboard based on a user's finger gesture recognized in the hand image,
wherein the outputting of the key comprises:
  recognizing a finger gesture of the user in the hand image and determining whether the finger gesture corresponds to a predetermined click gesture; and
  determining a key overlapping with a predetermined finger position of the user when the click gesture occurs,
wherein the click gesture comprises an interaction between at least two fingers of the user,
wherein the virtual keyboard comprises a plurality of key boxes, and at least one of the key boxes is provided as a multi-tap key in which keys are arranged as a plurality of layers,
wherein the virtual input method further comprises determining a predetermined layer gesture from the user's finger gesture, and
wherein the outputting of the key comprises determining a key of a layer corresponding to the layer gesture among the multi-tap keys.

19. The method of claim 18, wherein the determining of the layer gesture comprises calculating the number of fingers extended by the user when the click gesture occurs, and determining the layer gesture from the number of fingers.

* * * * *